United States Patent
Cheng

(10) Patent No.: US 11,852,925 B2
(45) Date of Patent: Dec. 26, 2023

(54) DISPLAY PANEL AND DISPLAY DEVICE HAVING SPACERS WITH DIFFERENT HEIGHTS

(71) Applicants: Beijing BOE Technology Development Co., Ltd., Beijing (CN); BOE TECHNOLOGY GROUP CO., LTD., Beijing (CN)

(72) Inventor: Hongfei Cheng, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 280 days.

(21) Appl. No.: 16/963,197

(22) PCT Filed: Jul. 25, 2019

(86) PCT No.: PCT/CN2019/097690
§ 371 (c)(1),
(2) Date: Jul. 17, 2020

(87) PCT Pub. No.: WO2021/012258
PCT Pub. Date: Jan. 28, 2021

(65) Prior Publication Data
US 2021/0405419 A1    Dec. 30, 2021

(51) Int. Cl.
*G02F 1/1339* (2006.01)
*G02F 1/1333* (2006.01)
(Continued)

(52) U.S. Cl.
CPC ...... *G02F 1/13396* (2021.01); *G02F 1/13338* (2013.01); *G02F 1/13394* (2013.01); *G02F 1/136286* (2013.01); *G06F 3/0412* (2013.01)

(58) Field of Classification Search
None
See application file for complete search history.

(56) References Cited

U.S. PATENT DOCUMENTS

| 2008/0117182 A1* | 5/2008 | Um | G06F 3/047 345/173 |
| 2010/0053535 A1* | 3/2010 | Kim | G02F 1/13394 174/254 |

(Continued)

FOREIGN PATENT DOCUMENTS

| CN | 103649882 A | 3/2014 |
| CN | 106597759 A | 4/2017 |

OTHER PUBLICATIONS

European Patent Office, EP19930171.4 Supplementary Partial European Search Report dated May 31, 2022.

(Continued)

*Primary Examiner* — Lauren Nguyen
(74) *Attorney, Agent, or Firm* — HOUTTEMAN LAW LLC

(57) ABSTRACT

A display panel includes an array substrate, a color filter substrate, a liquid crystal layer and a plurality of spacers located between the array substrate and the color filter substrate. The plurality of spacers include at least one first spacer, at least one second spacer and at least one third spacer. The at least one first spacer is on the array substrate, the at least one second spacer and the at least one third spacer are on the color filter substrate and respectively overlap the at least one first spacer in a direction perpendicular to the display panel. The at least one first spacer, the at least one second spacer and the at least one third spacer have a first height, a second height and a third height respectively along the direction perpendicular to the display panel, and the second height is different from the third height.

15 Claims, 6 Drawing Sheets

(51) Int. Cl.
G02F 1/1362 (2006.01)
G06F 3/041 (2006.01)

(56) References Cited

U.S. PATENT DOCUMENTS

| | | | |
|---|---|---|---|
| 2011/0102698 A1* | 5/2011 | Wang | G02F 1/13338 349/54 |
| 2012/0086654 A1 | 4/2012 | Song | |
| 2012/0319974 A1 | 12/2012 | Kim et al. | |
| 2013/0235294 A1* | 9/2013 | Nomura | G02F 1/13394 438/30 |
| 2015/0309630 A1 | 10/2015 | Yang et al. | |
| 2015/0378194 A1 | 12/2015 | Park et al. | |
| 2016/0154266 A1 | 6/2016 | Chen et al. | |
| 2016/0202526 A1 | 7/2016 | Shim et al. | |
| 2017/0242286 A1 | 8/2017 | Li et al. | |

OTHER PUBLICATIONS

European Patent Office, EP19930171.4 Extended European Search Report dated Sep. 16, 2022.

* cited by examiner

DISPLAY PANEL AND DISPLAY DEVICE HAVING SPACERS WITH DIFFERENT HEIGHTS

TECHNICAL FIELD

The present disclosure relates to the field of display technology, and in particular, to a display panel and a display device.

BACKGROUND

Liquid crystal displays (LCDs) have a wide market. Due to their simpler and faster human-computer interaction, LCDs with touch control or touch function have become more and more popular. In-cell touch display screens have the advantages of being light and thin, increased definition and low cost, and therefore, the in-cell touch display screens have been steadily and continuously growing in high-end display market.

In general, spacers are used to control a gap between an array substrate and a color filter substrate so as to maintain an optimal liquid crystal layer thickness. For a display panel with a touch function, the conventional spacers have caused a technical problem that touch detection precision is affected due to a large deformed area.

SUMMARY

According to a first aspect of the present disclosure, the present disclosure provides a display panel, including an array substrate, a color filter substrate, a liquid crystal layer and a plurality of spacers sandwiched between the array substrate and the color filter substrate. The plurality of spacers include at least one first spacer, at least one second spacer and at least one third spacer. The at least one first spacer is on the array substrate, the at least one second spacer and the at least one third spacer are on the color filter substrate and respectively overlap the at least one first spacer in a direction perpendicular to the display panel. The at least one first spacer, the at least one second spacer and the at least one third spacer have a first height, a second height and a third height respectively along the direction perpendicular to the display panel, and the second height is different from the third height.

In some embodiments, the array substrate is divided into a plurality of driving electrode regions and a plurality of sensing electrode regions alternately arranged along a row direction. The sensing electrode regions are uninterrupted or continuous along a column direction. Each column of the driving electrode regions includes multiple driving electrode regions, each of the plurality of driving electrode region is provided with a first common electrode, and each of the plurality of sensing electrode region is provided with a second common electrode. At least one driving electrode line is within the plurality of driving electrode regions and the plurality of sensing electrode regions alternately arranged along the row direction, and continuously extends along the row direction through driving electrode regions and sensing electrode regions in a same row. The first common electrode in the driving electrode region is connected with the driving electrode line through at least one first via.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The driving electrode line is in parallel with the gate lines. The first spacer is on the array substrate at a position between orthographic projections of the driving electrode line and gate line that are adjacent to each other on the array substrate, and overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The driving electrode line is in parallel with the gate lines. An orthographic projection of the first spacer on the array substrate overlaps both an orthographic projection of the gate line on the array substrate and an orthographic projection of the driving electrode line on the array substrate, and further overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The driving electrode region is provided therein with at least one dummy transverse sensing electrode line and at least one dummy longitudinal sensing electrode line, with the at least one dummy transverse sensing electrode line being in parallel with the gate lines, and the at least one dummy longitudinal sensing electrode line being in parallel with the data lines and connected with the at least one dummy transverse sensing electrode line. The first spacer is on the array substrate at a position between orthographic projections of the gate line and dummy transverse sensing electrode line that are adjacent to each other on the array substrate, and overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The driving electrode region is provided therein with at least one dummy transverse sensing electrode line and at least one dummy longitudinal sensing electrode line, with at least one dummy transverse sensing electrode line being in parallel with the gate lines, and the at least one dummy longitudinal sensing electrode line being in parallel with the data lines and connected with the at least one dummy transverse sensing electrode line. An orthographic projection of the first spacer on the array substrate overlaps both an orthographic projection of the gate line on the array substrate and an orthographic projection of the dummy transverse sensing electrode line on the array substrate, and further overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The sensing electrode region is provided therein with at least one transverse sensing electrode line and at least one longitudinal sensing electrode line, with the at least one transverse sensing electrode line being in parallel with the gate lines, and the at least one longitudinal sensing electrode line being in parallel with the data lines and connected with the at least one transverse sensing electrode line. The first spacer is on the array substrate at a position between orthographic projections of the gate line and transverse sensing electrode line that are adjacent to each other on the array substrate, and overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. The sensing electrode region is provided therein with at least one transverse sensing electrode line and at least one longitudinal sensing electrode line, with the at least one transverse sensing electrode line being in parallel with the gate lines, and the at least one longitudinal sensing electrode line being in parallel with the data lines and connected with the at least one dummy transverse sensing electrode line. An orthographic projection of the first spacer on the array substrate overlaps an orthographic projection of the gate line on the array substrate and an orthographic projection of the transverse sensing electrode line on the array substrate, respectively, and further overlaps an orthographic projection of the data line on the array substrate.

In some embodiments, the array substrate includes a plurality of pixel units arranged along a plurality of rows and a plurality of columns. A plurality of data lines are disposed between the plurality of columns of pixel units along the column direction, and a plurality of gate lines are disposed between the plurality of rows of pixel units along the row direction. No longitudinal sensing electrode line or dummy longitudinal sensing electrode line is disposed on an intermediate data line at the boundary between the driving electrode region and the sensing electrode region. In the driving electrode region or the sensing electrode region, no longitudinal sensing electrode line or dummy longitudinal sensing electrode line is disposed on data lines connected with pixel units having the same color as that of pixel units connected with the intermediate data line. Among all the data lines, the first spacer is only located on the intermediate data line and the data lines on which no longitudinal sensing electrode line or dummy longitudinal sensing electrode line is disposed.

In some embodiments, the first spacer, the second spacer, and the third spacer have rectangular, circular, or oval cross-section shapes in a plane where the array substrate is located.

In some embodiments, a first length of the first spacer along a row direction is greater than a second length of the second spacer along the row direction and is also greater than a third length of the third spacer along the row direction.

In some embodiments, the array substrate includes a plurality of pixel units arranged along a plurality of rows and a plurality of columns. The first spacer has a first length along a row direction. The first length is greater than a distance between adjacent data lines, greater than a second length of the second spacer along the row direction, and also greater than a third length of the third spacer along the row direction.

In some embodiments, the first length of the first spacer spans two pixel units.

In some embodiments, each of a second length of the second spacer along a row direction and a third length of the third spacer along the row direction is greater than a first length of the first spacer along the row direction. Each of a second width of the second spacer and a third width of the third spacer is smaller than a first width of the first spacer.

In some embodiments, each of the heights of the first spacer, the second spacer, and the third spacer is all in a range of 1 μm to 2 μm.

According to a second aspect of the present disclosure, the present disclosure provides a display device including the above display panel.

DETAILED DESCRIPTION

Figure 1:
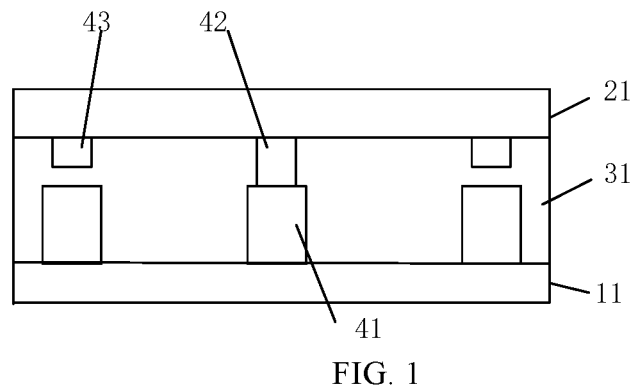
FIG. 1 is a schematic structural diagram showing a display panel according to an embodiment of the present disclosure.

In order to enable those skilled in the art to better understand the technical solutions of the present disclosure, the present disclosure is further described in detailed below with reference to the accompanying drawings and the specific implementations.

The embodiments of the present disclosure are described below, the examples of the embodiments are illustrated in the accompanying drawings, and the same or similar reference numerals refer to the same or similar elements, or elements having the same or similar functions throughout the present disclosure. The embodiments described below with reference to the accompanying drawings are exemplary, are only used to explain the present disclosure, and should not be understood to limit the present disclosure.

In the present disclosure, a dimension of a spacer along a row direction is defined as a length, a dimension of the spacer along a direction perpendicular to the row direction in a plane parallel to a display panel is defined as a width, and a dimension of the spacer along a direction perpendicular to the display panel is defined as a height. Directions along the length, width, and height of the spacer are respectively referred to as a length direction, a width direction and a height direction. A section shape of the spacer along the height direction is referred to as a longitudinal section shape, and a section shape of the spacer along a plane parallel to the display panel is referred to as a cross-section shape.

In the present disclosure, the row direction is a direction along which a gate line extends, and a column direction is a direction along which a data line extends.

According to some embodiments of the present disclosure, a display panel includes an array substrate 11, a color filter substrate 21, a liquid crystal layer 31 and spacers packaged between the array substrate 11 and the color filter substrate 21. Referring to FIG. 1, first spacers 41 are disposed on the array substrate 11, and second spacers 42 and third spacers 43 are disposed facing the first spacers 41 on the color filter substrate 21. The second spacers 42 and the third spacers 43 overlap the first spacers 41 respectively. The second spacer 42 is in contact with a surface of the first spacer 41, and there is a gap between the third spacer 43 and the first spacer 41. That is, a height of the third spacer 43 is smaller than that of the second spacer 42, so as to ensure that the first spacer 41 is in contact with a surface of the second spacer 42. The heights of the first spacer, the second spacer and the third spacers are all in the range of 1 µm to 2 µm. The cross-section shapes and the longitudinal section shapes of the first spacer 41, the second spacer 42, and the third spacer 43 are not limited herein. For example, the first spacer 41, the second spacer 42, and the third spacer 43 may have a circular, oval, or rectangular cross-section shape, and have a rectangular longitudinal section shape. In general, the spacers are disposed between the array substrate 11 and the color filter substrate 21, so that a gap between the array substrate 11 and the color filter substrate 21 can be controlled to maintain an optimal thickness of the liquid crystal layer. According to some embodiments of the present disclosure, the spacers are respectively disposed on the array substrate and the color filter substrate, which may prevent a large deformed area of the color filter substrate during touch operations and avoid an influence on the touch detection precision.

According to some embodiments of the present disclosure, for a display panel with a touch function, the array substrate thereof is provided with common electrodes. At least a part of the common electrode also function as touch electrodes, that is, those electrodes are used as touch electrodes when receiving a touch action, and are used as common electrodes when no touch action is received. In order to make it easy to distinguish, a common electrode with a touch driving function and an auxiliary electrode located thereon are referred to as a driving electrode, and a common electrode with a touch sensing function and an auxiliary electrode located thereon are referred to as a sensing electrode in the present disclosure. The auxiliary electrodes of the driving electrode and the sensing electrode are described in detail below.

Figure 2:
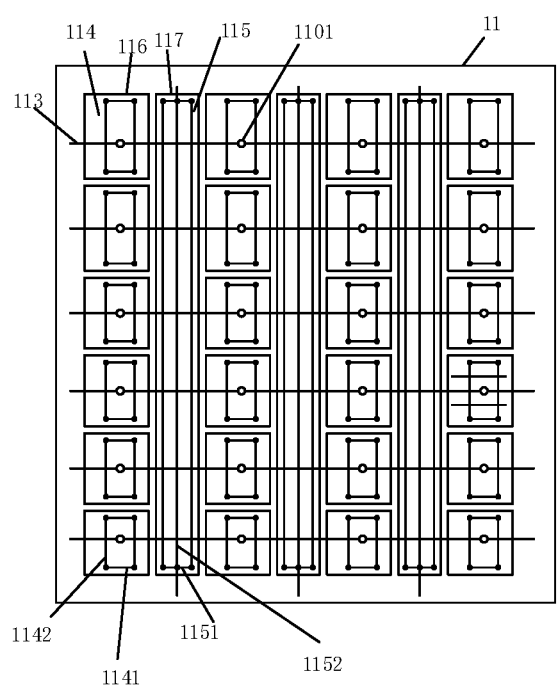
FIG. 2 is a plan view showing common electrodes of an array substrate of a display panel according to an embodiment of the present disclosure.
Figure 3:
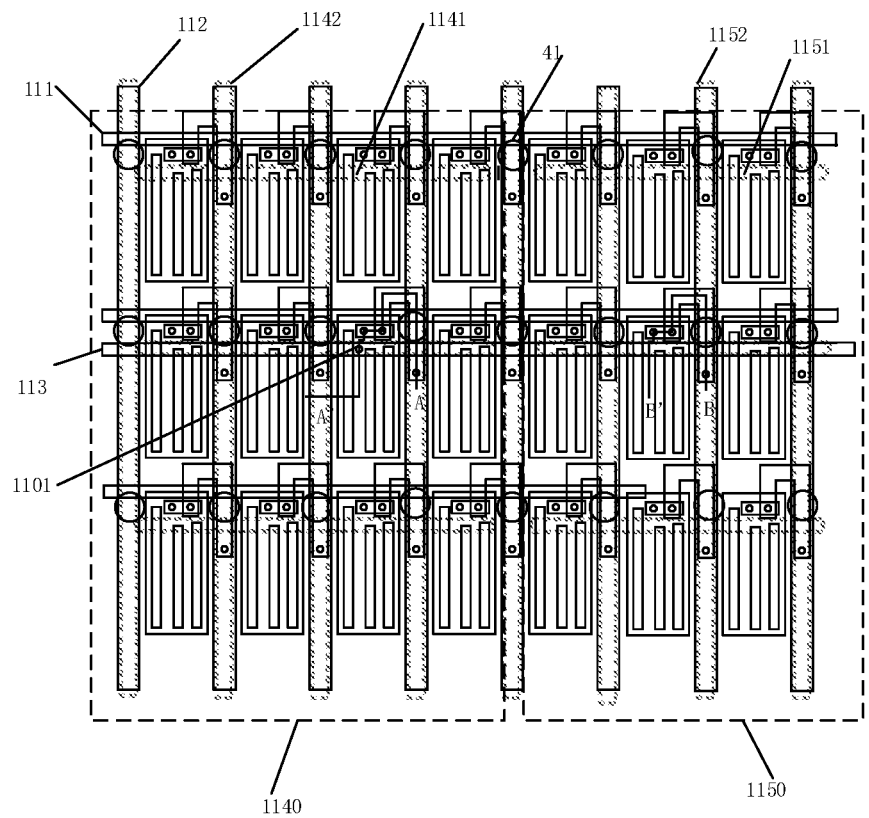
FIG. 3 is a schematic diagram showing a plane structure of an array substrate and spacers of a display panel according to an embodiment of the present disclosure.
Figure 4:
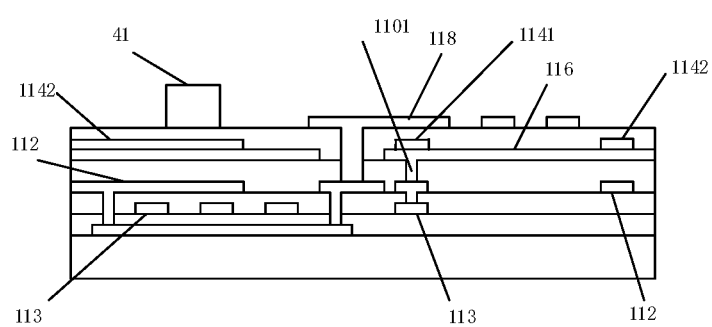
FIG. 4 is a sectional view of a display panel along a line AA' in FIG. 3 according to an embodiment of the present disclosure.

Referring to FIG. 2 to FIG. 4, an arrangement of common electrodes of an array substrate of a display panel is described below. According to whether a common electrode is shared, the array substrate 11 is divided into a plurality of driving electrode regions 1140 and a plurality of sensing electrode regions 1150, which are alternately arranged in a row direction. A shared common electrode is disposed in each driving electrode region 1140 and each sensing electrode region 1150. Each driving electrode region 1140 is provided with a first common electrode 116, and each sensing electrode region 1150 is provided with a second common electrode 117. The driving electrode regions 1140 are discontinuous from each other along a column direction, and the sensing electrode regions 1150 are uninterrupted or continuous along the column direction. Sensing electrode lines are disposed on the second common electrode 117 in the sensing electrode region 1150, and include a transverse sensing electrode line 1151 and a longitudinal sensing electrode line 1152 which are connected with each other. Moreover, in order to obtain a uniform electric field, dummy sensing electrode lines are further provided on the first common electrode 116 in the driving electrode region 1140, and include a dummy transverse sensing electrode line 1141 and a dummy longitudinal sensing electrode line 1142 which are connected with each other. In the present disclosure, the second common electrode 117, and the transverse sensing electrode line 1151 and the longitudinal sensing electrode line 1152 located on the second common electrode 117 are referred to as a sensing electrode 115, and the first common electrode 116, and the dummy transverse sensing electrode line 1141 and the longitudinal dummy longitudinal sensing electrode line 1142 located on the first common electrode are referred to as a driving electrode 114. The dummy longitudinal sensing electrode line 1142 and the dummy transverse sensing electrode line 1141 are disposed in the same layer as the longitudinal sensing electrode line 1152 and the transverse sensing electrode line 1151. The dummy longitudinal sensing electrode line 1142 and the dummy transverse sensing electrode line 1141 are directly connected with the first common electrode 116, and the longitudinal sensing electrode line 1152 and the transverse sensing electrode line 1151 are directly connected with the second common electrode 117. The dummy longitudinal sensing electrode line 1142 and the dummy transverse sensing electrode line 1141 in the driving electrode regions 1140 are disconnected from the longitudinal sensing electrode line 1152 and the transverse sensing electrode line 1151 in the sensing electrode regions 1150, and the dummy longitudinal sensing electrode lines 1142 in the driving electrode regions 1140 adjacent along the column direction are disconnected from each other. Driving electrode lines 113 in the driving electrode regions 1140 and the sensing electrode regions 1150 are connected with each other along the row direction.

The array substrate includes a plurality of pixel units arranged along a plurality of rows and a plurality of columns. A plurality of data lines 112 are disposed between the plurality of columns of pixel units along the column direction, a plurality of gate lines 111 are disposed between the plurality of rows of pixel units along the row direction, and the driving electrode lines 113 are located in a gate layer of the pixel units and are parallel to the gate lines. The first spacer 41 is located above the data line 112, and is located above a position between the gate line 111 and the driving electrode line 113. In some embodiments, an orthographic projection of the first spacer 41 on the array substrate may overlap both an orthographic projection of the gate line on the substrate and an orthographic projection of the driving electrode line on the substrate, and meanwhile overlap an orthographic projection of the data line 112 on the substrate. In some embodiments, an orthographic projection of the first spacer 41 on the array substrate is located between the orthographic projections, on the array substrate, of the driving electrode line 113 and gate line 111 that are adjacent to each other and overlaps an orthographic projection of the data line 112 on the array substrate.

Meanwhile, in the driving electrode region, the first spacer 41 are also located above the data line 112, and is located above a position between the gate line 111 and dummy transverse sensing electrode line 1141 that are adjacent to each other.

In some embodiments, the first spacer 41 is located between orthographic projections, on the array substrate, of the gate line 111 and dummy transverse sensing electrode line 1141 that are adjacent to each other and overlaps an orthographic projection of the data line 112 on the array substrate. In some embodiments, an orthographic projection of the first spacer 41 on the array substrate overlaps both an orthographic projection of the gate line 111 and the dummy transverse sensing electrode line 1141 on the array substrate respectively, and further overlaps an orthographic projection of the data line 112 on the array substrate.

In the sensing electrode region, the first spacer 41 is also located above the data line 112, and is located above a position between the gate line 111 and transverse sensing electrode line 1151 that are adjacent to each other.

In some embodiments, the first spacer 41 is located between orthographic projections, on the array substrate, of the gate line 111 and transverse sensing electrode line 1151 that are adjacent to each other and overlaps an orthographic projection of the data line 112 on the array substrate. In some embodiments, an orthographic projection of the first spacer 41 on the array substrate overlaps orthographic projections of the gate line 111 and the transverse sensing electrode line 1151 on the array substrate, respectively, and further overlaps an orthographic projection of the data line 112 on the array substrate.

The common electrode located in the driving electrode region is connected to the driving electrode line 113 through a first via 1101.

FIG. 4 is a cross-sectional view of an array substrate along a line AA' in FIG. 3. Referring to FIG. 4, in the driving electrode region 1140, the driving electrode 114 includes the dummy transverse sensing electrode line 1141 and the dummy longitudinal sensing electrode line 1142, wherein the dummy transverse sensing electrode line 1141 is disposed on the first common electrode 116 and extends along the row direction; and the dummy longitudinal sensing electrode line 1142 is disposed on the first common electrode 116, extends along the column direction, and is connected with the dummy transverse sensing electrode line 1141. Meanwhile, the driving electrodes 114 (or the first common electrodes 116) in the same row are connected with the driving electrode line 113 through the first vias 1101. In the driving electrode region 1140, an orthographic projection of the first spacer 41 on the array substrate is located within an orthographic projection of the driving electrode 114 on the array substrate.

Figure 5:
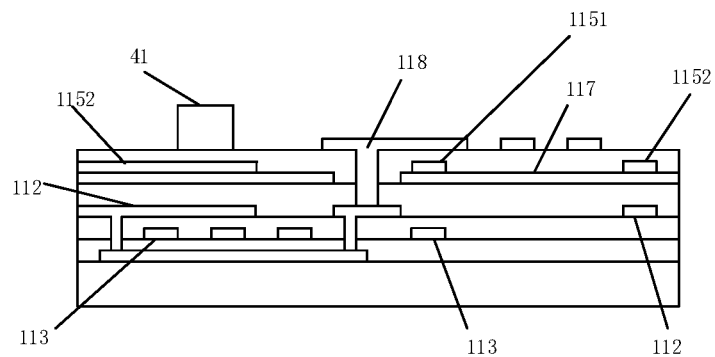
FIG. 5 is a sectional view of a display panel along a line BB' in FIG. 3 according to an embodiment of the present disclosure.

FIG. 5 is a sectional view of an array substrate along a line BB' in FIG. 3. Referring to FIG. 5, in the sensing electrode region 1150, the sensing electrode 115 further includes the transverse sensing electrode line 1151 and the longitudinal sensing electrode line 1152, wherein the transverse sensing electrode line 1151 is disposed on the second common electrode 117 and extends along the row direction; and the longitudinal sensing electrode line 1152 is disposed on the second common electrode 117, extends along the column direction, and is connected with the transverse sensing electrode line 1151. In the sensing electrode region 1150, an orthographic projection of the first spacer 41 on the array substrate is located within an orthographic projection of the sensing electrode 115 on the array substrate.

According to an embodiment of the present disclosure, a slit pixel electrode 118 is provided on the first common electrode 116 or the second common electrode 117, and an insulating layer is further formed between the slit pixel electrode 118 and the first common electrode 116 or the second common electrode 117.

Figure 6:
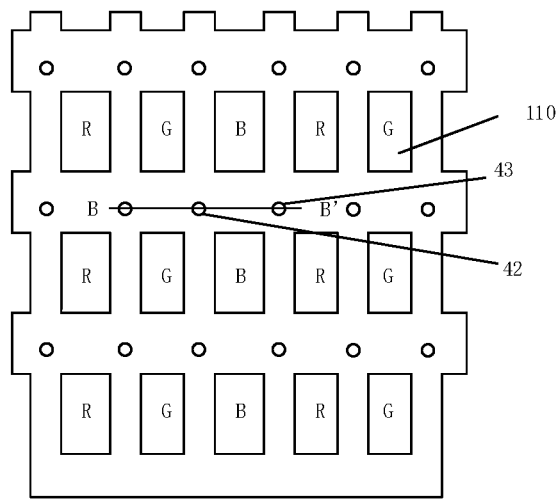
FIG. 6 is a schematic diagram showing a plane structure of a color filter substrate and spacers according to an embodiment of the present disclosure.

According to an embodiment of the present disclosure, spacers are disposed both on the array substrate 11 and the color filter substrate 21. Referring to FIG. 6, second spacers 42 and third spacers 43 are disposed on the color filter substrate 21 at positions corresponding to the first spacers 41. The arrangement of the second spacers 42 and the third spacers 43 is not limited herein. In some embodiments, the second spacers 42 and the third spacers 43 are disposed at intervals along the row direction.

The cross-section shapes of the first spacers 41, the second spacers 42, and the third spacers 43 are not limited herein, and may be, for example, rectangular, oval, or circular. The longitudinal section shapes of the first spacers 41, the second spacers 42, and the third spacers 43 may be rectangular.

Figure 7:
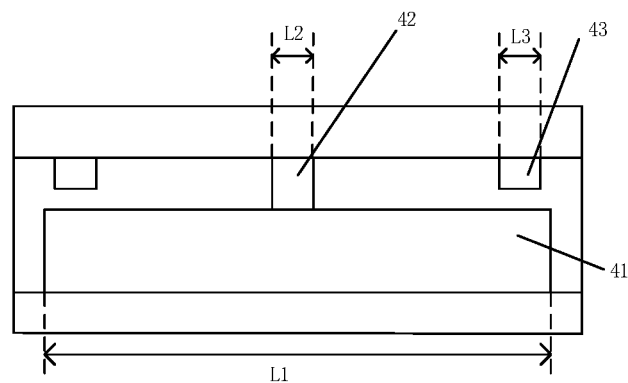
FIG. 7 is a schematic structural diagram showing a display panel according to another embodiment of the present disclosure.

According to other embodiments of the present disclosure, the spacers may be arranged in different ways. Referring to FIG. 7, the longitudinal section shape of the first spacer 41 on the array substrate 11 is in a shape of rectangle, a long side of the rectangle is a side extending along a length direction of the first spacer, and the first spacer 41 extends along the length direction beyond a distance between the adjacent data lines. A length $L_1$ of the first spacer 41 spans at least one pixel unit, and is greater than the distance between the adjacent data lines, and is also greater than a length of the second spacer 42 and a length of the third spacer 43. In some embodiments, the length $L_1$ of the first spacer spans two pixel units. In the present embodiment, the lengths of the second spacer 42 and the third spacer 43 may not be limited thereto. The length $L_2$ of the second spacer 42 may be different from or the same as the length $L_3$ of the third spacer 43.

In the present embodiment, each of the first spacers corresponds to a plurality of second and third spacers, so that alignment between the array substrate and the color filter substrate is simpler and more convenient.

Figure 8:
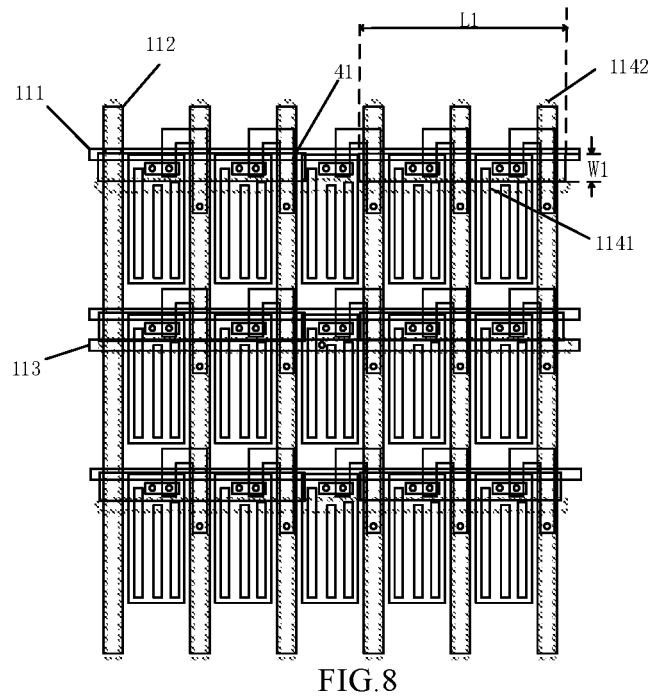
FIG. 8 is a schematic diagram illustrating a portion of a structure of a display substrate according to another embodiment of the present disclosure.

FIG. 8 shows a position of the first spacer 41 on the array substrate in the present embodiment. The first spacer 41 may be disposed in the driving electrode region at a position between the gate line 111 and dummy transverse sensing electrode line 1141 that are adjacent to each other, or a position between the gate line 111 and driving electrode line 113 that are adjacent to each other. Accordingly, in the sensing electrode region, the first spacer may be disposed at a position between the gate line 111 and transverse sensing electrode line 1151 that are adjacent to each other, or a position between the gate line 111 and driving electrode line 113 that are adjacent to each other.

Figure 9:
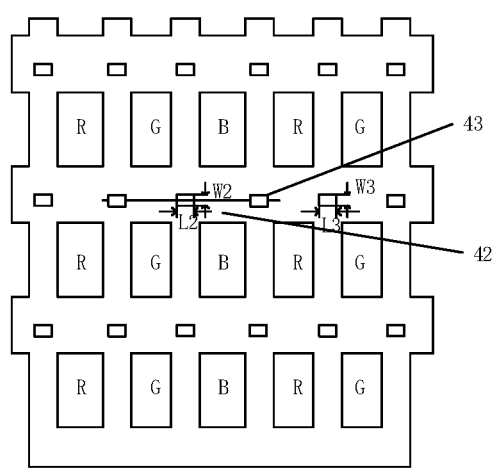
FIG. 9 is a schematic diagram showing a plane structure of a color filter substrate and spacers according to another embodiment of the present disclosure.

In some embodiments, referring to FIG. 9, the widths of the first spacers 41, the second spacers 42 and the third spacers 43 are not limited. A width $W_2$ of the second spacer 42 may be the same as or different from a width $W_3$ of the third spacer 43.

The cross-section shapes of the first spacers 41, the second spacers 42, and the third spacers 43 are not limited herein, and may be, for example, rectangular, oval, or circular. The longitudinal section shapes of the first spacers 41, the second spacers 42, and the third spacers 43 may be rectangular. The cross-section shape of the second spacers 42 and the third spacers 43 are rectangular in FIG. 9, and the cross-section shape of the second spacers 42 and the third spacers 43 are circular in FIG. 6.

Figure 10:
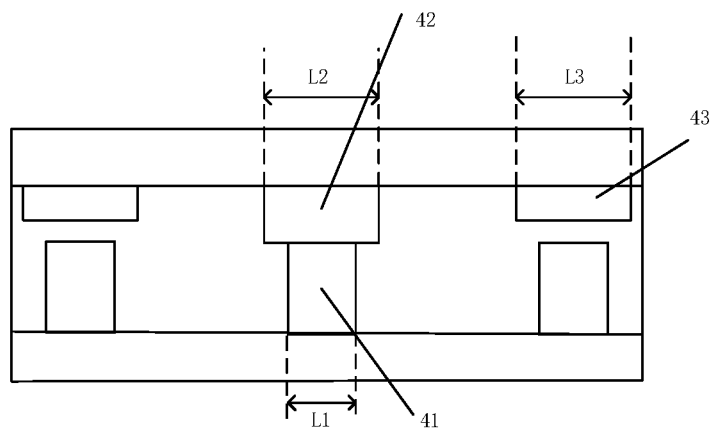
FIG. 10 is a schematic structural diagram showing a display panel according to still another embodiment of the present disclosure.

According to other embodiments of the present disclosure, referring to FIG. 10, each of the length $L_2$ of the second spacer 42 and the length $L_3$ of the third spacer 43 is greater than the length $L_1$ of the first spacer 41. Meanwhile, each of the width $W_2$ of the second spacer 42 and the width $W_3$ of the third spacer 43 is smaller than the width $W_1$ of the first spacer 41 (not shown in FIG. 10).

Figure 11:
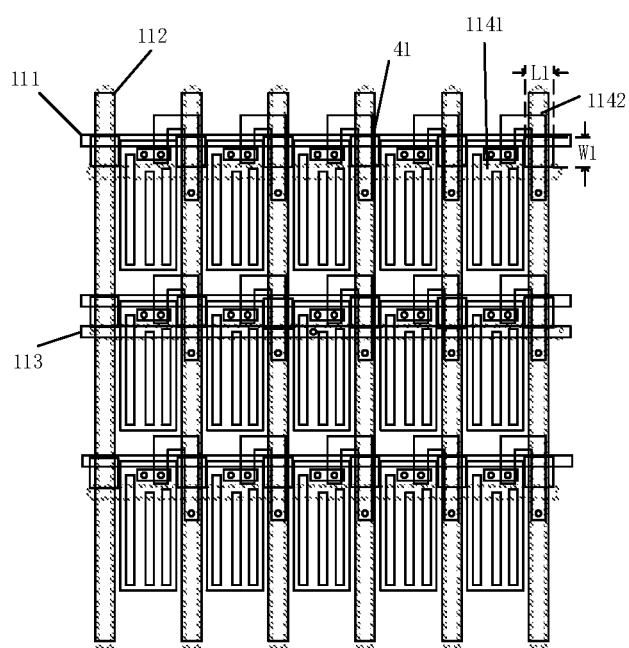
FIG. 11 is a schematic diagram showing a portion of a structure of an array substrate according to still another embodiment of the present disclosure.

FIG. 11 shows the positions of the first spacers on the array substrate in the present embodiment. In the driving electrode region, the first spacer 41 is disposed at a position between the gate line 111 and dummy transverse sensing electrode line 1141 that are adjacent to each other and overlaps the data line, or disposed at a position between the gate line 111 and driving electrode line 113 that are adjacent to each other and overlaps the data line. In the sensing electrode region, the first spacer is disposed at a position between the gate line 111 and transverse sensing electrode line that are adjacent to each other and overlaps the data line 112, or disposed at a position between the gate line 111 and driving electrode line 113 that are adjacent to each other and overlaps the data line 112.

Figure 12:
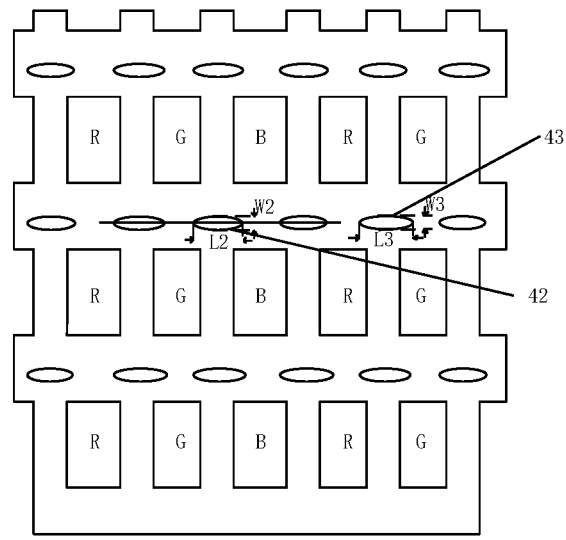
FIG. 12 is a schematic diagram showing a plane structure of a color filter substrate and spacers according to still another embodiment of the present disclosure.

According to an embodiment of the present disclosure, the spacers are disposed both on the array substrate 11 and the color filter substrate 21. Referring to FIG. 12, the second spacers 42 and the third spacers 43 are provided on the color filter substrate 21 at positions corresponding to the first spacers 41. The arrangement of the second spacers 42 and the third spacers 43 is not limited herein. In some embodiments, the second spacers 42 and the third spacers 43 are disposed at intervals.

In the present embodiment, the widths of the second spacers 42 and the third spacers 43 are not specifically limited, and for example, the width $W_2$ of the second spacer 42 and the width $W_3$ of the third spacer 43 are different from the width $W_1$ of the first spacer 41.

The cross-section shapes of the first spacers 41, the second spacers 42, and the third spacers 43 are not limited herein, and may be, for example, rectangular, oval, or circular. The longitudinal section shapes of the first spacers 41, the second spacers 42, and the third spacers 43 may be rectangular. The cross-section shapes of the second spacers 42 and the third spacers 43 are oval in FIG. 12.

Figure 13:
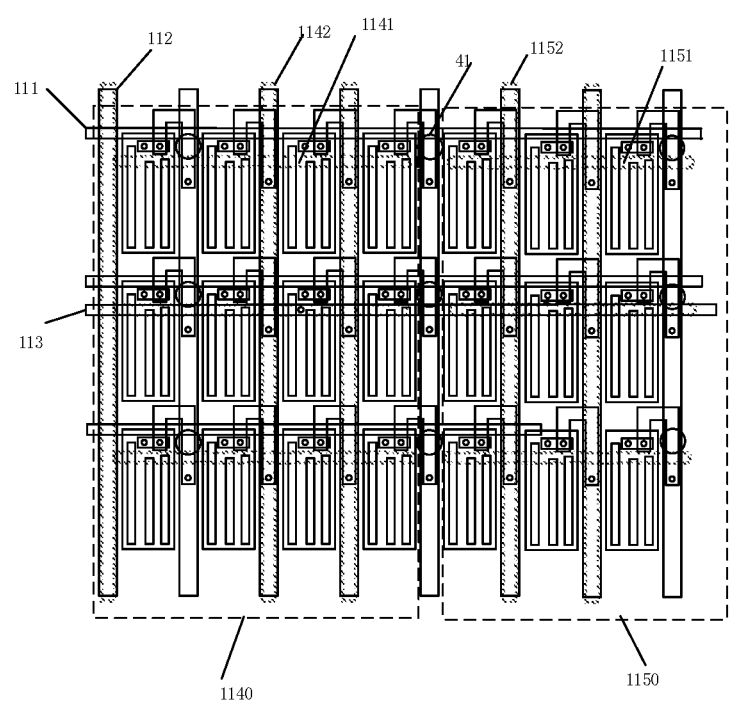
FIG. 13 is a schematic diagram showing a portion of a structure of an array substrate according to yet another embodiment of the present disclosure.

According to some embodiments of the present disclosure, referring to FIG. 13, no longitudinal sensing electrode line 1152 or dummy longitudinal sensing electrode line 1142 is provided on a data line 112 (also referred to as an intermediate data line) at the boundary between a driving electrode region 1140 and a sensing electrode region 1150, so as to separate the driving electrode region 1140 from the sensing electrode region 1150. The first spacers 41 are disposed at the position of the intermediate data line. Meanwhile, in order to achieve uniform distribution of a touch electric field on the array substrate, the first spacers 41 are also disposed at and only at the positions of the data lines connected with the pixel units having the same color as that of the pixel units connected with the intermediate data line. For example, if the intermediate data line at the boundary between the driving electrode region 1140 and the sensing electrode region 1150 is connected with red pixel units, the first spacers 41 are only disposed at the positions of the data lines connected with all red sub-pixel units, and no first spacer 41 is disposed on the data lines connected with other color pixel units, such as green pixel units and blue pixel units.

According to some embodiments of the present disclosure, the first spacers 41, the second spacers 42, and the third spacers 43 are all made of a resin material. Each of the heights of the first spacers, the second spacers, and the third spacers is in a range of 1 μm to 2 μm.

According to some embodiments of the present disclosure, the gate lines, the data lines, the driving electrodes and the sensing electrodes may be made of a metal material such as Cu, Al, Mo, Ti, Cr, and W, or the alloys thereof, and may have a single-layer structure, or a multi-layer structure, such as Mo\Al\Mo, Ti\Cu\Ti, and MoTi\Cu. The common electrodes and the slit pixel electrodes may be made of ITO.

According to another aspect of the present disclosure, the present disclosure provides a display device including the above display panel.

In the Description of the present disclosure, the term "one embodiment", "another embodiment" or the like indicates that the specific feature, structure, material, or characteristic described in conjunction with such embodiment is included in at least one embodiment of the present disclosure. In the Description, the illustration of the above term is not necessarily intended to refer to the same embodiment or example. Furthermore, the specifically described features, structures, materials, or characteristics may be combined in any suitable manner in any one or more embodiments or examples. Moreover, those skilled in the art can combine the various embodiments or examples and the features therein that are described in the Description if no conflict is incurred.

It should be understood that the above embodiments are merely exemplary embodiments employed to illustrate the principles of the present disclosure, and the present disclosure is not limited thereto. Various changes, modifications, substitutions and variations can be made by those skilled in the art without departing from the spirit and essence of the present disclosure, and should be considered to fall within the scope of the present disclosure.

What is claimed is:

1. A display panel, comprising an array substrate, a color filter substrate, a liquid crystal layer and a plurality of spacers located between the array substrate and the color filter substrate, wherein the plurality of spacers comprise at least one first spacer, at least one second spacer and at least one third spacer, the at least one first spacer is on the array substrate, the at least one second spacer and the at least one third spacer are on the color filter substrate and respectively overlap the at least one first spacer in a direction perpendicular to the display panel, and the at least one first spacer, the at least one second spacer and the at least one third spacer have a first height, a second height and a third height respectively along the direction perpendicular to the display panel, with the second height different from the third height, wherein the array substrate has a plurality of driving electrode regions and a plurality of sensing electrode regions alternately arranged along a row direction, each of the plurality of driving electrode region is provided with a first common electrode, and each of the plurality of sensing electrode region is provided with a second common electrode, the array substrate comprises:

a plurality of data lines and a plurality of gate lines intersect each other to define a plurality of pixel units, a plurality of driving electrode lines extending along a row direction to pass through the driving electrode regions and the sensing electrode regions in a same row, a dummy transverse sensing electrode line and a dummy longitudinal sensing electrode line both located in the driving electrode region and on a side of the at least one first spacer away from the at least one second spacer, and electrically connected to each other and both electrically connected to one of the plurality of driving electrode lines through a first via and the first common electrode, wherein the dummy transverse sensing electrode line is in parallel with the plurality of gate lines, and the dummy longitudinal sensing electrode line is in parallel with the plurality of data lines, wherein each of an orthographic projection of the dummy transverse sensing electrode line and an orthographic projection of a first gate line of the plurality of gate lines on the array substrate overlaps orthographic projections, on the array substrate, of multiple pixel units arranged in a same row of pixel units, an orthographic projection of the dummy longitudinal sensing electrode line on the array substrate overlaps orthographic projections of multiple gate lines on the array substrate and overlaps an orthographic projection of a first data line of the plurality of data lines on the array substrate, an orthographic projection of the first spacer on the array substrate is between the orthographic projections of the dummy transverse sensing electrode line and the first gate line on the array substrate, and overlaps the orthographic projection of the dummy longitudinal sensing electrode line on the array substrate.

2. The display panel of claim 1, wherein the sensing electrode regions are continuous along a column direction, each column of the plurality of driving electrode regions comprises multiple driving electrode regions.

3. The display panel of claim 2, wherein the first spacer is on the array substrate at a position between orthographic projections of the driving electrode line and the gate line that are adjacent to each other on the array substrate, and overlaps an orthographic projection of the data line on the array substrate.

4. The display panel of claim 1, wherein an orthographic projection of the first spacer on the array substrate overlaps both orthographic projections of the gate line and the driving electrode line on the array substrate, and further overlaps an orthographic projection of the data line on the array substrate.

5. The display panel of claim 1, wherein an orthographic projection of the first spacer on the array substrate overlaps both an orthographic projection of the gate line on the array substrate and an orthographic projection of the dummy transverse sensing electrode line on the array substrate, and further overlaps an orthographic projection of the data line on the array substrate.

6. The display panel of claim 1, wherein the sensing electrode region is provided therein with at least one transverse sensing electrode line and at least one longitudinal sensing electrode line, with the at least one transverse sensing electrode line being in parallel with the gate lines, and the at least one longitudinal sensing electrode line being in parallel with the data lines and connected with the at least one transverse sensing electrode line, and the first spacer is on the array substrate at a position between orthographic projections of the gate line and transverse sensing electrode line that are adjacent to each other on the array substrate, and overlaps an orthographic projection of the data line on the array substrate.

7. The display panel of claim 1, wherein the sensing electrode region is provided therein with at least one transverse sensing electrode line and at least one longitudinal sensing electrode line, with the at least one transverse sensing electrode line being in parallel with the gate lines, and the at least one longitudinal sensing electrode line being in parallel with the data lines and connected with the at least one transverse dummy sensing electrode line, and an orthographic projection of the first spacer on the array substrate overlaps both an orthographic projection of the gate line on the array substrate and an orthographic projection of the transverse sensing electrode line on the array substrate, and further overlaps an orthographic projection of the data line on the array substrate.

8. The display panel of claim 1, wherein no longitudinal sensing electrode line or dummy longitudinal sensing electrode line is disposed on an intermediate data line at a boundary between the driving electrode region and the sensing electrode region, in the driving electrode region or the sensing electrode region, no longitudinal sensing electrode line or dummy longitudinal sensing electrode line is disposed on data lines connected with pixel units having the same color as that of pixel units connected to the intermediate data line, and among all the data lines, the first spacer is only on the intermediate data line and the data lines on which no longitudinal sensing electrode line or dummy longitudinal sensing electrode line is disposed.

9. The display panel of claim 1, wherein the first spacer, the second spacer, and the third spacer have rectangular, circular, or oval cross-section shape in a plane where the array substrate is located.

10. The display panel of claim 1, wherein a first length of the first spacer along a row direction is greater than a second length of the second spacer along the row direction, and is also greater than a third length of the third spacer along the row direction.

11. The display panel of claim 1, wherein the array substrate comprises a plurality of pixel units arranged along a plurality of rows and a plurality of columns, the first spacer has a first length along a row direction, and the first length is greater than a distance between adjacent data lines, greater than a second length of the second spacer along the row direction, and also greater than a third length of the third spacer along the row direction.

12. The display panel of claim 11, wherein the first length of the first spacer spans two pixel units.

13. The display panel of claim 1, wherein
each of a second length of the second spacer along a row direction and a third length of the third spacer along the row direction is greater than a first length of the first spacer along the row direction, and each of a second width of the second spacer and a third width of the third spacer is smaller than a first width of the first spacer.

14. The display panel of claim 1, wherein each of the heights of the first spacer, the second spacer, and the third spacer is in a range of 1 μm to 2 μm.

15. A display device, comprising the display panel of claim 1.

* * * * *